US011306896B2

(12) United States Patent
Wang et al.

(10) Patent No.: US 11,306,896 B2
(45) Date of Patent: Apr. 19, 2022

(54) INTEGRATED LIGHT ENGINES INCLUDING FLEXIBLE OPTICS AND FLEXIBLE LIGHT SOURCES

(71) Applicant: OSRAM SYLVANIA Inc., Wilmington, MA (US)

(72) Inventors: Zhuo Wang, Middleton, MA (US); Bruce Radl, Stow, MA (US); Douglas Harriott, Melrose, MA (US)

(73) Assignee: ABL IP HOLDING LLC, Atlanta, GA (US)

( * ) Notice: Subject to any disclaimer, the term of this patent is extended or adjusted under 35 U.S.C. 154(b) by 157 days.

(21) Appl. No.: 15/315,338

(22) PCT Filed: Jun. 1, 2015

(86) PCT No.: PCT/US2015/033606
§ 371 (c)(1),
(2) Date: Nov. 30, 2016

(87) PCT Pub. No.: WO2015/184458
PCT Pub. Date: Dec. 3, 2015

(65) Prior Publication Data
US 2017/0122533 A1    May 4, 2017

Related U.S. Application Data

(60) Provisional application No. 62/005,972, filed on May 30, 2014, provisional application No. 62/005,963, filed on May 30, 2014.

(51) Int. Cl.
*F21V 7/00* (2006.01)
*G02B 19/00* (2006.01)
(Continued)

(52) U.S. Cl.
CPC ........ *F21V 7/0083* (2013.01); *F21V 19/0025* (2013.01); *F21V 19/02* (2013.01);
(Continued)

(58) Field of Classification Search
CPC .... F21V 19/02; F21V 19/0025; F21V 7/0083; F21S 4/22; F21Y 2107/50; F21Y 2107/70
See application file for complete search history.

(56) References Cited

U.S. PATENT DOCUMENTS 4,935,665 A * 6/1990 Murata ............... H01L 25/0753
313/500
6,299,337 B1 * 10/2001 Bachl ..................... H01L 25/13
362/545
(Continued)

FOREIGN PATENT DOCUMENTS

DE    10 200 6031345 A1    10/2008
WO    2004/102064 A1    11/2004

OTHER PUBLICATIONS

Christoph Baur, International Search Report and Written Opinion of the International Searching Authority for PCT/US2015/033606, dated Aug. 17, 2015, pp. 1-13, European Patent Office, Rijswijk, The Netherlands.

*Primary Examiner* — Alan B Cariaso
(74) *Attorney, Agent, or Firm* — Kilpatrick Townsend & Stockton LLP

(57) ABSTRACT

An integrated light engine including flexible optics and a flexible light source, and lighting devices including the same, are provided. The integrated light engine includes a flexible light source configured to emit light, and flexible optics coupled to the flexible light source. The flexible optics beam shapes light emitted by the flexible light source. The integrated light engine is capable of entering a set of states, such that a portion of beam shaped light emitted by the integrated light engine in a first state is aimed in a first (Continued)

direction and a portion of beam shaped light emitted by the integrated light engine in a second state is aimed in a second direction. Different combinations of the flexible optics with the flexible light source result in the integrated light engine being able to enter a number of flexed states or being held in a substantially flat, substantially stiff state.

22 Claims, 12 Drawing Sheets

(51) Int. Cl.
    *F21V 19/00*       (2006.01)
    *F21V 19/02*       (2006.01)
    *F21V 23/06*       (2006.01)
    *F21Y 105/10*     (2016.01)
    *F21Y 107/10*     (2016.01)
    *F21Y 115/10*     (2016.01)

(52) U.S. Cl.
    CPC .......... *F21V 23/06* (2013.01); *G02B 19/0066* (2013.01); *F21Y 2105/10* (2016.08); *F21Y 2107/10* (2016.08); *F21Y 2115/10* (2016.08)

(56) References Cited

U.S. PATENT DOCUMENTS

| | | | |
|---|---|---|---|
| 8,033,681 B2* | 10/2011 | Brass | F21L 4/00 362/202 |
| 8,360,608 B2* | 1/2013 | Wildner | G09F 9/301 362/237 |
| 8,926,127 B2 | 1/2015 | Sinofsky | |
| 9,000,346 B2* | 4/2015 | Dinc | F21K 9/00 250/214 AL |
| 9,410,665 B2* | 8/2016 | Lind | G09F 13/0404 |
| 9,869,456 B2* | 1/2018 | Speer | F21V 15/012 |
| 2002/0001193 A1* | 1/2002 | Osawa | F21S 4/22 362/249.14 |
| 2003/0147253 A1* | 8/2003 | Shy | B60Q 1/2665 362/545 |
| 2005/0265029 A1 | 12/2005 | Epstein et al. | |
| 2007/0053179 A1 | 3/2007 | Pang et al. | |
| 2008/0117619 A1* | 5/2008 | Pang | F21K 9/00 362/84 |
| 2009/0103299 A1* | 4/2009 | Boyer | F21V 17/164 362/237 |
| 2010/0097809 A1 | 4/2010 | Munro et al. | |
| 2010/0149783 A1* | 6/2010 | Takenaka | F21K 9/232 362/84 |
| 2010/0277666 A1* | 11/2010 | Bertram | F21K 9/00 349/61 |
| 2013/0051017 A1* | 2/2013 | Heim | F21V 7/0083 362/247 |
| 2013/0110264 A1* | 5/2013 | Weast | G04G 17/06 700/91 |
| 2013/0114267 A1 | 5/2013 | Ho et al. | |
| 2013/0201690 A1* | 8/2013 | Vissenberg | E04B 9/0464 362/296.07 |
| 2014/0085865 A1 | 3/2014 | Yun et al. | |
| 2014/0369038 A1* | 12/2014 | Tischler | G09F 13/00 362/235 |

\* cited by examiner

INTEGRATED LIGHT ENGINES INCLUDING FLEXIBLE OPTICS AND FLEXIBLE LIGHT SOURCES

CROSS-REFERENCE TO RELATED APPLICATIONS

The present application is a National Stage application of, and claims priority of, International Application No. PCT/US2015/033606, which claims priority of U.S. Provisional Application No. 62/005,972, entitled "INTEGRATED OPTICS AND INTEGRATED LIGHT ENGINES" and filed May 30, 2014, and U.S. Provisional Application No. 62/005,963, entitled "HYBRID OPTICS" and filed May 30, 2014, the entire contents of both of which are hereby incorporated by reference.

TECHNICAL FIELD

The present invention relates to lighting, and more specifically, to optical devices for solid state light sources.

BACKGROUND

Conventional light engines use a substrate material, such as FR4 or metal core circuit board, with one or more solid state light sources attached thereto. The substrate can be shaped into a variety of shapes, and can be cut into different sizes as well. Thus, for example, a lamp including one or more solid state light sources typically includes a light engine that fits within the shape of the lamp, while a two foot by two foot troffer style luminaire including one or more solid state light sources typically includes a light engine that is nearly the size of the luminaire. These solid state light source-based light engines, though different in size and composition from conventional light sources, offer increased energy efficiency without the use of mercury or other environmentally unfriendly metals and longer life than conventional light sources. Further, such light engines are typically easy to attach to lighting devices, using, for example, screws.

However, particularly for larger applications, conventional light engines may be costly. Conventional substrate materials add increased weight to a lighting device as well. Thus, light engines made of lightweight, flexible materials have been introduced. Such flexible light engines, including those with printed metal inks on a polymer sheet and those with etched copper traces on laminated polymer sheets, offer cost savings over traditional rigid substrates. Flexible light engines also offer increased design options due to their flexibility.

SUMMARY

A luminaire or fixture typically is required to have a certain mechanical strength. In order to achieve the required mechanical strength when a flexible light engine is present, a luminaire typically must also include a metal frame or other stiff structures to hold the flexible light engine in place, so as to maintain the mechanical integrity of the luminaire. This will inevitably increase the cost and weight of the fixture, negating some of the savings realized by using a flexible light engine instead of a conventional light engine. Further, though the light engine is flexible, the optical system of the luminaire is not flexible.

Embodiments provide integrated light engines including flexible light sources, such as but not limited to flexible light engines, coupled by flexible optics. The flexible optics are made of polymer sheets that have one or more cellular lighting elements which surround the one or more solid state light sources of the flexible light engine. The flexible optics may be made highly reflective, such as by doping with titanium dioxide or other chemicals, and are relatively inexpensive. The flexible optics also allow the flexible light source to maintain its flexibility, even when put into a lighting device, while adding some mechanical strength to the flexible light source. Further, the flexible optics can be oriented in relation to the flexible light source such that the flexible light engine remains in a relatively stiff state, providing a mechanically reinforced structure that can be more easily added to a lighting device or that can be a lighting device itself. The flexible optics provide desired cut-off angles for light emitted by the flexible light source so as to reduce glare, increase light distribution, increase optical efficiency, and maintain a spacing ratio close to, or sometimes better than, that of lambertion distributed solid state light sources, while also reducing cost. For example, the total cost (including the material cost and the forming cost) for a flexible optical system measuring two feet by two feet, in some embodiments, is less than three dollars. For embodiments where the flexible optical system is made of polyethylene terephthalate (PET), a known recyclable material, the flexible optical system and thus a large portion of the integrated light engine is thus recyclable, adding to the environmental friendliness of the integrated light engine.

In an embodiment, there is provided an integrated light engine. The integrated light engine includes a flexible light source configured to emit light; and a flexible optical system coupled thereto, wherein the flexible optical system beam shapes light emitted by the flexible light source.

In a related embodiment, the integrated light engine may be configured to be placed into a lighting device, such that, when the flexible light source receives power, light emitted by the flexible light source and beam shaped by the flexible optical system illuminates an area.

In another related embodiment, the flexible light source may include a flexible substrate comprising conductive traces; and one or more solid state light sources, the one or more solid state light sources may be electrically connected to the conductive traces. In a further related embodiment, the flexible substrate may be capable of moving between a substantially flat state and a substantially flexed state, and the flexible substrate may include a planar shape having a thickness when in the substantially flat state. In a further related embodiment, the planar shape of the flexible substrate, when in the substantially flat state, may be a substantially quadrilateral planar shape. In another further related embodiment, the flexible optical system may have a footprint corresponding to the planar shape of the flexible substrate when in the substantially flat state. In a further related embodiment, the flexible optical system may include a plurality of cellular optical elements.

In a further related embodiment, the plurality of cellular optical elements may be interconnected so as to occupy a plane corresponding to the footprint of the flexible optical system. In another further related embodiment, the one or more solid state light sources may be arranged in a first arrangement on the flexible substrate and the plurality of cellular optical elements may be arranged in a second arrangement. In a further related embodiment, the first arrangement and the second arrangement may correspond such that at least one cellular optical element in the plurality of cellular optical elements contains at least one of the one or more solid state light sources.

In another further related embodiment, the plurality of cellular optical elements may extend outward from the integrated light engine. In still another further related embodiment, each cellular optical element in the plurality of cellular optical elements may have a lower portion and an upper portion, the lower portions are joined together to define the footprint of the flexible optical system. In a further related embodiment, light emitted by the flexible light source may exit the integrated light engine by passing through the upper portions of the plurality of cellular optical elements. In another further related embodiment, light emitted by the flexible light source may exit the integrated light engine by passing through the lower portions of the plurality of cellular optical elements.

In still another related embodiment, the flexible optical system may include a plurality of cellular optical elements.

In a further related embodiment, the plurality of cellular optical elements may be interconnected so as to occupy a plane corresponding to a footprint of the flexible optical system. In a further related embodiment, the footprint of the flexible optical system may have a planar shape. In a further related embodiment, the flexible light source may have a substantially flat state, and a shape of the flexible light source in the substantially flat shape may be a planar shape corresponding to the footprint of the flexible optical system.

In another further related embodiment, the plurality of cellular optical elements may be arranged in a second arrangement. In a further related embodiment, the flexible light source may include a set of solid state light sources arranged in a first arrangement, and the first arrangement and the second arrangement may correspond such that at least one cellular optical element in the plurality of cellular optical elements contains at least one of the set of solid state light sources.

In yet another further related embodiment, the plurality of cellular optical elements may extend outward from the integrated light engine.

In still another further related embodiment, each cellular optical element in the plurality of cellular optical elements may have a lower portion and an upper portion, the lower portions may be joined together to define a footprint of the flexible optical system. In a further related embodiment, light emitted by the flexible light source may exit the integrated light engine by passing through the upper portions of the plurality of cellular optical elements. In another further related embodiment, light emitted by the flexible light source may exit the integrated light engine by passing through the lower portions of the plurality of cellular optical elements.

In yet another further related embodiment, the flexible optical system may be coupled to the flexible light source in an orientation, with the plurality of cellular optical elements in a corresponding direction.

In another related embodiment, the flexible light source may be capable of moving between a substantially flat state and a flexed state, and the flexible optical system may be capable of moving between a substantially flat state and a flexed state. In a further related embodiment, the state of the flexible light source may be the state of the flexible optical system. In another further related embodiment, the flexible light source may be capable of moving between a substantially flat state and a plurality of flexed states, and the flexible optical system may be capable of moving between a substantially flat state and a plurality of flexed states. In a further related embodiment, the state of the flexible light source may correspond to the state of the flexible optical system.

In yet another further related embodiment, the flexible optical system may be coupled to the flexible light source in an orientation, with the plurality of cellular optical elements in a corresponding direction. In a further related embodiment, the flexible optical system may be coupled to the flexible light source in a first orientation, with the plurality of cellular optical elements in a corresponding first direction, such that the flexible optical system is in a substantially flat state, and the flexible light source is held in a correspondingly substantially flat state by the flexible optical system. In another further related embodiment, the flexible optical system may be coupled to the flexible light source in a second orientation, with the plurality of cellular optical elements in a corresponding second direction, such that the flexible optical system is capable of being placed in one of a set of flexed states, and the flexible light source is correspondingly placed in the same one of the set of flexed states.

In another embodiment, there is provided a lighting device. The lighting device includes: an electrical connection from a power source; and an integrated light engine, including: a flexible light source configured to emit light; and a flexible optical system coupled thereto, wherein the flexible optical system beam shapes light emitted by the flexible light source; wherein the integrated light engine is capable of entering a set of states, such that a portion of beam shaped light emitted by the integrated light engine in a first state of the set of states is aimed in a first direction and a portion of beam shaped light emitted by the integrated light engine in a second state of the set of states is aimed in a second direction.

In a related embodiment, the first state may be a first flexed state, the second state may be a second flexed state, the first flexed state may be different from the second flexed state, and the first direction may be different from the second direction. In another related embodiment, the first state may be a first flexed state, the second state may be a second flexed state, the first flexed state may be different from the second flexed state, and the first direction may be the same as the second direction.

In still another related embodiment, the flexible optical system may be coupled to the flexible light source in a first orientation or a second orientation. In a further related embodiment, the flexible optical system may be coupled to the flexible light source in the first orientation, such that the set of states the integrated light engine is capable of entering is a set of flexed states. In another further related embodiment, the flexible optical system may be coupled to the flexible light source in the second orientation, such that the set of states the integrated light engine is capable of entering is a set of substantially flat states. In a further related embodiment, the set of substantially flat states may include a substantially flat, substantially stiff state.

In yet another related embodiment, the flexible optical system may include a plurality of cellular optical elements that extend outward from the integrated light engine. In still another related embodiment, the flexible optical system may include a plurality of cellular optical elements, each cellular optical element in the plurality of cellular optical elements may have a lower portion and an upper portion, the lower portions may be joined together to define a footprint of the flexible optical system. In a further related embodiment, light emitted by the flexible light source may exit the lighting device by passing through the upper portions of the plurality of cellular optical elements. In another further related embodiment, light emitted by the flexible light source may exit the lighting device by passing through the lower portions of the plurality of cellular optical elements.

In yet still another related embodiment, the flexible optical system may be coupled to the flexible light source in an orientation, with the plurality of cellular optical elements in a corresponding direction. In a further related embodiment, the flexible optical system may be coupled to the flexible light source in a first orientation, with the plurality of cellular optical elements in a corresponding first direction, such that the flexible optical system may be in a substantially flat state of the set of states, and the flexible light source may be held in a corresponding substantially flat state by the flexible optical system. In another further related embodiment, the flexible optical system may be coupled to the flexible light source in a second orientation, with the plurality of cellular optical elements in a corresponding second direction, such that the flexible optical system may be capable of being placed in one of a set of flexed states of the set of states, and the flexible light source may be correspondingly placed in the same one of the set of flexed states of the set of states.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Integrated light engines including flexible light sources with mechanical strength as well as beam distribution controlled via flexible optical systems are disclosed. The integrated light engines may be either stiff or flexible, depending on the design and/or orientation of the flexible optical system in relation to the flexible light source. Thus, in some embodiments, the flexibility of the flexible light source is maintained through use of the flexible optical system. Alternatively, in some embodiments, the otherwise flexible light source is purposefully stiffened through use of the flexible optical system. Thus, the same flexible light source combined with, in some embodiments, the same flexible optical system, which are both initially flexible, can either retain the flexibility of the flexible light source or become stiff and thus provide a mechanically reinforced structure if desired. The combination of flexible light source with a flexible optical system, referred to throughout as an integrated light engine, provides a desired cut-off angle (e.g., 50°) while maintaining a spacing ratio close or even better than that of Lambertion distributed solid state light sources.

Thus, embodiments provide integrated light engines that are stiff, substantially stiff, flexible, or substantially flexible, and thus are capable of passing from one state to another. A flexible integrated light engine is able to aim the solid state light sources in certain directions, while a stiff integrated light engine mimics, and in some embodiments, improves, the performance of current non-integrated light engines at lighter weight and lower cost. The flexible light source portion of an integrated light engine may have different degrees of flexibility, including but not limited to very flexible (e.g., a PET substrate with printed traces) and mostly flexible (a PET substrate with etched traces). When combined with a sheet of flexible optics (i.e., a flexible optical system), itself made from a flexible material such as but not limited to PET, the integrated light engine itself is still very flexible.

Figure 1A:
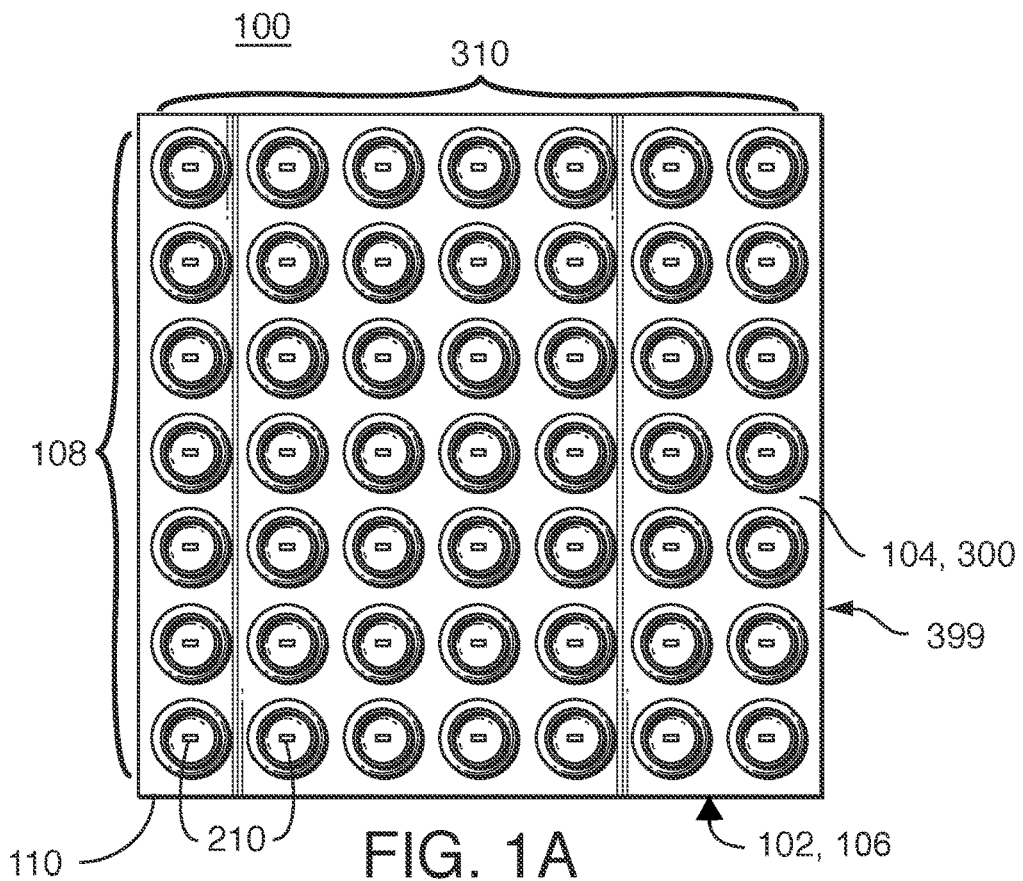
FIG. 1A shows an integrated light engine including a flexible light source integrated with a flexible optical system to create a substantially flat, bendable integrated light engine according to embodiments disclosed herein.
Figure 1B:
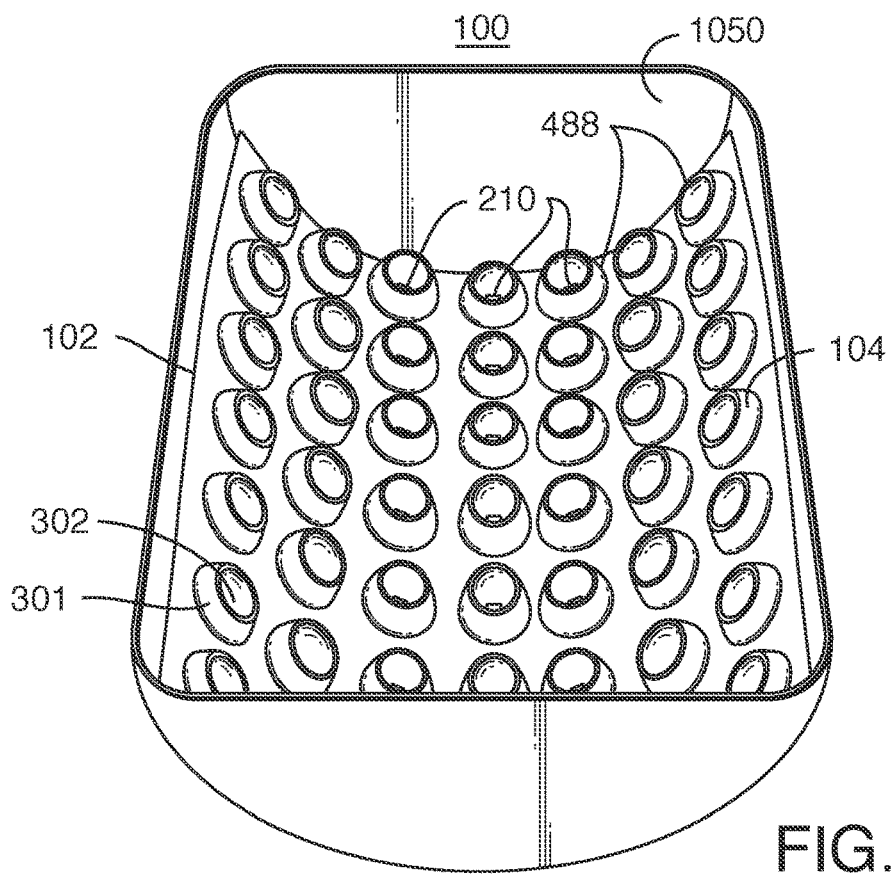
FIG. 1B shows the integrated light engine of FIG. 1A in a lighting device, receiving power and curved to aim the light sources of the integrated light engine in different directions, according to embodiments disclosed herein.
Figure 1C:
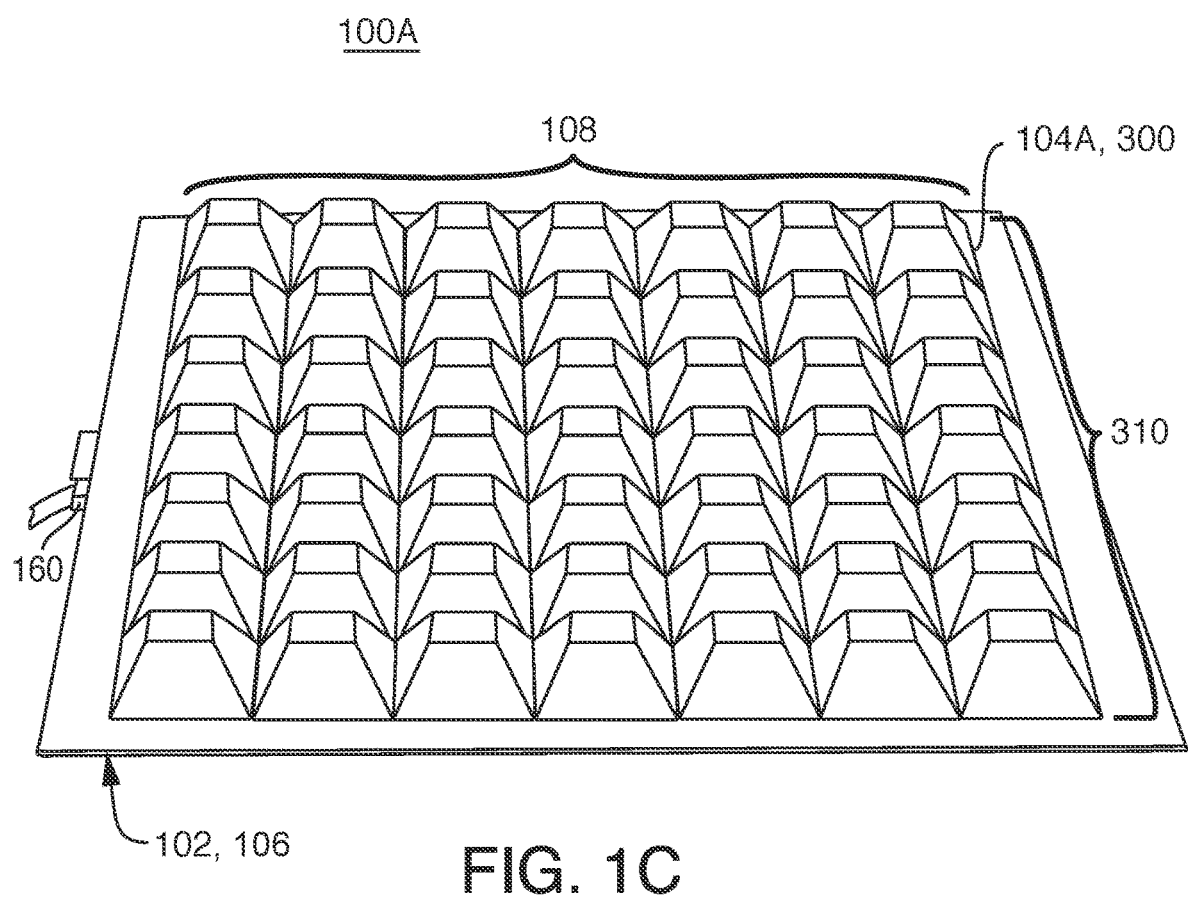
FIG. 1C shows an integrated light engine having a different flexible optical system than FIGS. 1A and 1B, receiving power and emitting light, according to embodiments disclosed herein.

An integrated light engine 100/100A is shown in FIGS. 1A, 1B, and 1C. In FIG. 1A, the integrated light engine 100 includes a flexible light source 102, configured to emit light, and a flexible optical system 104 coupled to the flexible light source 102. The flexible optical system 104 beam shapes light emitted by the flexible light source 102, as described in detail with regards to FIG. 5 below. Though the flexible light source 102 is partially obscured by the flexible optical system 104, it is possible to see a plurality of light sources 210 of the flexible light source 102 through the flexible optical system 104. The integrated light engine 100 of FIG. 1A also includes a stiff, flat heatsink 110, creating a tile-like structure from the integrated light engine 100. This tile-like structure, in some embodiments, is a lighting device capable of receiving power from a power source (not shown) and providing illumination to an area (see FIG. 1B). Any light emitted by the integrated light engine 100 when it receives power from a power source is beam shaped by the flexible optical system 104 so as to illuminate an area. A portion of beam shaped light emitted by the integrated light engine 100 when in such a substantially flat state, is aimed in a direction, as described in greater detail below.

For example, as shown in FIG. 1B, the integrated light engine 100 is placed into a lighting device, more particularly an open box structure 1050, causing the integrated light engine 100 to partially bend, so as to aim the light sources 210 in certain directions. The aimed solution shown in FIG. 1B will help to achieve certain distributions, if desired. FIG. 1B shows the integrated light engine 100 receiving power, such that light is emitted by the flexible light source 102. This emitted light is then beam shaped by the flexible optical system 104 so as to illuminate an area. When the integrated light engine 100 is a state of being flexed, i.e., bent in one way, as shown in FIG. 1B, a portion of beam shaped light emitted by the integrated light engine 100 is aimed in a direction. This direction may be, and in some embodiments is, different from the direction of the portion of beam shaped light emitted by the integrated light engine 100 in the substantially flat state of FIG. 1A.

Another embodiment of an integrated light engine 100A is shown in FIG. 1C. Though the light sources of the flexible light source 102 are not visible in FIG. 1C, due to the flexible optical system 104A, the flexible light source 102 receives power from an electrical connection 160, which causes the flexible light source 102 to emit light. The shapes of the flexible optical system 104A differ from the shapes of the flexible optical system 104 shown in FIGS. 1A and 1B, as described in greater detail below.

Figure 2A:
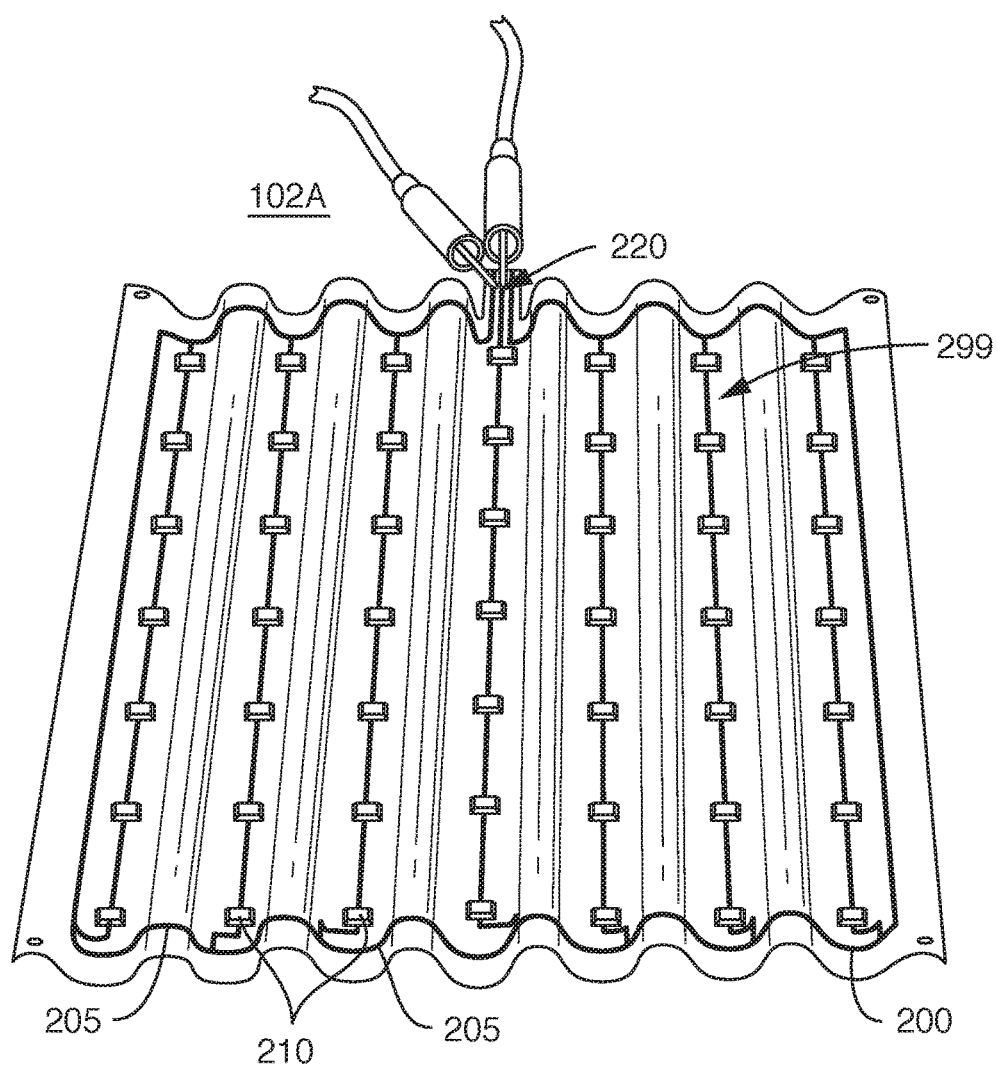
FIGS. 2A and 2B show a flexible light source according to embodiments disclosed herein.
Figure 2B:
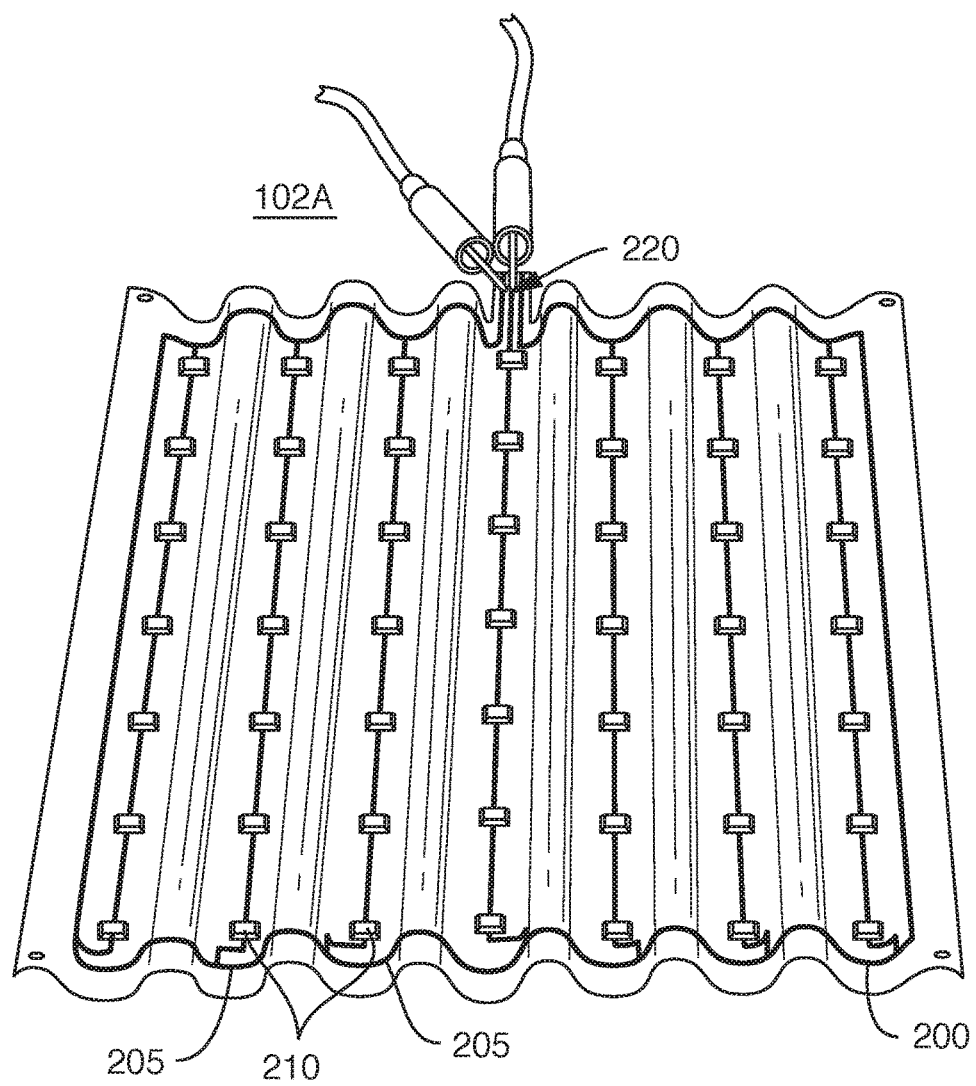

An example flexible light source is shown in FIGS. 2A and 2B. In FIG. 2A, a flexible light source 102A includes a flexible substrate 200 comprising conductive traces 205 and one or more light sources 210. The one or more light sources 210 are electrically connected to the conductive traces 205. Though FIGS. 2A and 2B show the flexible light source 102A as a conventional flexible light engine that could be made on a non-flexible substrate, in some embodiments, other flexible light sources such as but not limited to one or more flexible organic light emitting diodes, are used. Further, though FIGS. 2A and 2B show the one or more light sources 210 as solid state light sources, any type of light source capable of being made flexible, either through placement on a flexible substrate or other flexible material, or that are inherently flexible, is capable of being used in embodiments disclosed throughout. FIG. 2B shows the flexible light source 102A of FIG. 2A receiving power through an electrical connection 220 from a power source (not shown), which causes the one or more light sources 210 to emit light.

Figure 2C:
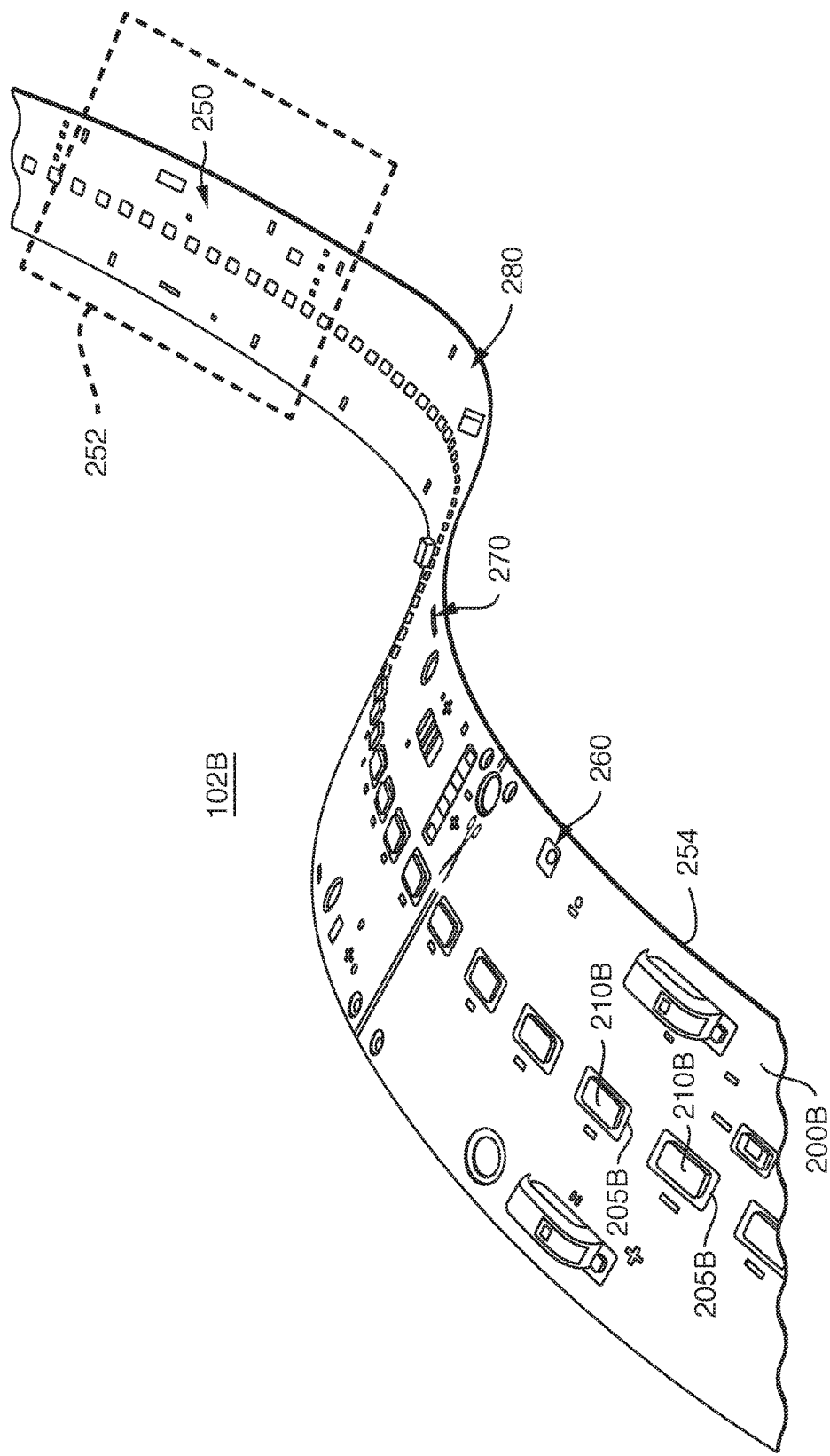
FIG. 2C shows another flexible light source according to embodiments disclosed herein.

FIG. 2C shows another flexible light source 102B including a flexible substrate 200B, conductive traces 205B (which are partially obscured), and one or more light sources 210B that are electrically connected to the conductive traces 205B. In FIG. 2C, the flexible substrate 200B, and thus the flexible light source 102B, is capable of moving between a substantially flat state 250 and any number of substantially flexed states 260, 270, 280. Other examples of substantially flexed states are shown in FIGS. 2A and 2B, though the flexible light source 102A of FIGS. 2A and 2B is different in shape from the flexible light source 102B of FIG. 2C. The flexible substrate 200B, as seen most easily when in the substantially flat state 250, has a planar shape 252 and a thickness 254. In some embodiments, the planar shape 252 is a substantially quadrilateral planar shape, such as a rectangle shown in FIG. 2C.

In some embodiments, a flexible optical system has a footprint corresponding to the planar shape 252 of the flexible substrate 200 when in the substantially flat state. For example, as shown in FIGS. 1A and 1C, the flexible light source 102, and thus the flexible substrate that composes the flexible light source 102, is substantially flat. The flexible optical system 104/104A in FIGS. 1A and 1C has a footprint 108 corresponding to the planar shape 106 of the flexible light source 102. In some embodiments, the flexible optical system 104 comprises a plurality of cellular optical elements 300 (as shown throughout the figures). In some such embodiments, the plurality of cellular optical elements 300 are interconnected, as shown in for example FIGS. 1A and 1C, so as to occupy a plane 310. This plane 310 corresponds to the footprint 108 of the flexible optical system 104, and in some embodiments, such a footprint 108 does not correspond to the planar shape of the flexible light source that forms the integrated light engine with the flexible optical system 104. Thus, in some embodiments, the footprint 108 of the flexible optical system 104 is not dependent on the shape of the flexible light source 102/102A. In some embodiments, as shown in FIGS. 1A and 1C, the footprint 108 of the flexible optical system 104/104A has a planar shape, which as stated above, in some embodiments corresponds to the planar shape of the flexible light source 102 and in some embodiments does not. In some embodiments, the flexible light source 102 is in a substantially flat state and has a shape 106 that corresponds to the footprint 108 of the flexible optical system 104/104A. In some embodiments, the shape 106 is a planar shape, though of course, any other shape is possible.

In some embodiments, the one or more light sources 210 of the flexible light source 102 and the plurality of cellular optical elements 300 of the flexible optical system 104/104A each are arranged in respective arrangements. Thus, the one or more light sources 210 are arranged in a first arrangement 299 (see, for example, FIG. 2A) on the flexible substrate 200 and the plurality of cellular optical elements 300 are arranged in a second arrangement 399 (see, for example, FIG. 1A). In some embodiments, the first arrangement 299 (that is, the arrangement of the one or more light sources 210) and the second arrangement 399 (that is, the arrangement of the plurality of cellular optical elements 300) correspond, such that at least one cellular optical element 300A in the plurality of cellular optical elements 300 contains at least one 210A of the one or more light sources 210.

Figure 4:
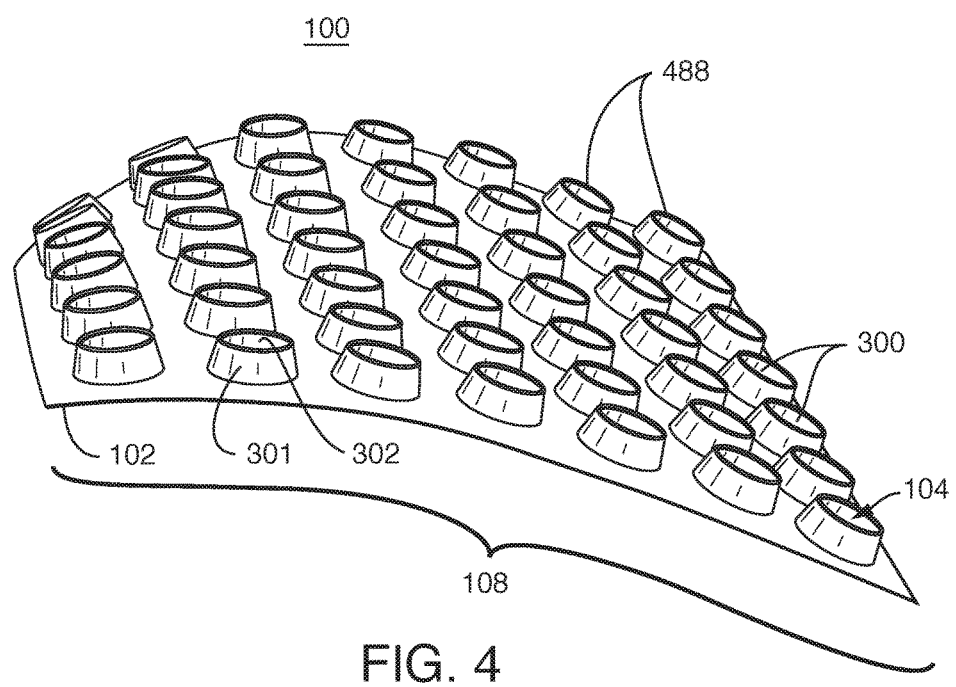
FIG. 4 shows a flexible light source integrated with a flexible optical system to create an integrated light engine capable of entering a number of flexed states, according to embodiments disclosed herein.

FIG. 4 shows an embodiment of an integrated light engine 100 featuring a flexible light source 102 covered with a sheet of cellular optical elements 300, which form a flexible optical system 104. Each cellular optical element 300 shown in FIG. 4 has a conical or volcano-like shape. The flexible light source 102 is beneath the flexible optical system 104, such that each light source on the flexible light source 102 is located at the bottom of the conical or volcano-like shape. Though FIG. 4 shows the cellular optical elements 300 as having conical or volcano-like shapes, embodiments are not so limited and the cellular optical elements 300 may, and in some embodiments do, take on other shapes, such as but not limited to pyramids, flat-topped pyramids, stepped pyramids, nozzles, frustums, domes, spheroid hemispheres, and so on. Possible shapes for the cellular optical elements are described in greater detail in a co-pending application entitled "HYBRID OPTICAL SYSTEMS INCLUDING FLEXIBLE OPTICAL SYSTEMS AND LIGHT CONTROL FILMS" and filed on the same day, the entire contents of which are hereby incorporated by reference. In some embodiments, the cellular optical elements 300 are one or more respective chambers divided by louvers, walls, spacers, or the like.

Whatever their shape, or orientation as described in greater detail below, the cellular optical elements 300 extend outward from the integrated light engine 100. In other words, an axis (not shown) that bisects the center of a cellular optical element in a direction of light emitted by a light source located within the cellular optical element is perpendicular, in some embodiments, to a plane that contains the flexible light source of the integrated light engine. In some embodiments, the axis is located at a different angle with the respect to the plane that contains the flexible light engine. In some embodiments, one or more of the cellular optical elements 300 has a lower portion 301 and an upper portion 302. In some embodiments, the lower portions 301 of the cellular optical elements 300 are joined together to define the footprint 108 of the flexible optical system 104. In some embodiments, such as shown in FIG. 4, light emitted by the flexible light source 102 exits the integrated light engine 100 by passing through the upper portions 302 of the plurality of cellular optical elements 300 (see, for example, FIG. 1B).

As seen in FIGS. 4 and 1B, among others, the flexible light source 102 and the flexible optical system 104 are capable of entering one or more flexed states, as well as being in a substantially flat state, such as shown in FIG. 1A. Thus, the integrated light engine 100 shown in FIG. 4 exhibits bending, or flexing, due to gravity acting on the weight of the integrated light engine 100, but also because of the flexibility of the flexible light source 102 and the flexible optical system 104 that comprise the integrated light engine 100. In other words, the particular combination of the flexible light source 102 and the flexible optical system 104 as shown in FIG. 4 permit the integrated light engine 100 to remain flexible, and enable the integrated light engine 100 and its component parts to enter one of any number of flexed states (for example, see FIGS. 1B, 2C, and 4). That is, the orientation of the flexible optical system 104, in some embodiments, determines if the flexible light source 102 flexes, and thus if the integrated light engine 100 flexes, or if the flexible light source 102, and thus the integrated light engine 100, becomes stiff and/or substantially stiff and/or otherwise less flexible. Thus, in some embodiments, the state of the flexible light source 102 corresponds to the state of the flexible optical system 104.

Figure 3:
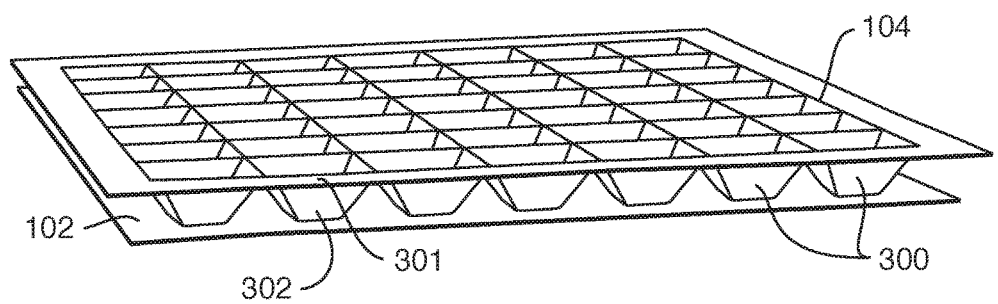
FIG. 3 shows a flexible light source integrated with a flexible optical system to create a substantially flat, substantially rigid integrated light engine according to embodiments disclosed herein.

In some embodiments, the orientation of the flexible optical system 104 determines the flexibility, or lack thereof, of the integrated light engine 100. Thus, in some embodiments, such as shown in the FIG. 4, the flexible optical system 104 is coupled to the flexible light source 102 in an orientation such that the cellular optical elements 300 of the flexible optical system 104 are in a direction that corresponds with that orientation. In FIG. 4, this direction is that the lower portions 301 of the cellular optical elements 300 are nearer the flexible light source 102 than the upper portions 302 of the cellular optical elements 300. Indeed, in some embodiments, the lower portions 301 of the cellular optical elements 300 sit on the flexible light source 102, and the upper portions 302 of the cellular optical elements 300 face away from the flexible light source 102. Of course, other orientations, with other directions of the cellular optical elements 300, are possible, such as shown in FIG. 3 and described in greater detail below. The orientation of the flexible optical system 104 when coupled to the flexible light source 102, with the cellular optical elements 300 facing in the direction as described above, allows the integrated light engine 100 and its component parts to be placed in one or more flexed states (i.e., the flexible optical system 104 and the flexible light source 102 are correspondingly placed in the same one of the set of flexed states). Examples of possible flexed states are shown in FIGS. 4 and 1B. Thus, in FIG. 4, a portion of light emitted by the flexible light source 102 and beam shaped by the flexible optical system 104 when in the flexed state of FIG. 4, where a central portion of the integrated light engine 100 is higher than its side portions (i.e., the integrated light engine 100 has a hump-like shape), is aimed in a particular direction. For example, a portion of beam shaped light emitted from a right side portion 488 of the integrated light engine 100 shown in FIG. 4 travels at a forty-five degree angle with respect to normal. In contrast, for the integrated light engine 100 shown in FIG. 1B, which is in a different flexed state such that its central portion is lower than its side portions (i.e., the integrated light engine 100 has a valley-like shape), a portion of light emitted by the flexible light source 102 that is beam shaped by the flexible optical system 104 is also aimed in a particular direction, which might be different. The same right side portion 488 of the integrated light engine 100 of FIG. 1B emits light that is beam shaped and travels at a one hundred and thirty-five degree angle to normal. Of course, some portions of beam shaped light aimed by the integrated light engine 100, whether flexed as shown in FIG. 1B or flexed as shown in FIG. 4 or flexed in any other way, aim the light in the same direction. Thus, a portion of the beam shaped light emitted from the central portion of the integrated light engines 100 shown in both FIGS. 1B and 4, which have different flexed states, nonetheless still travel in the same direction, such as perpendicular to normal.

A change in the orientation of the flexible optical system 104 in relation to the flexible light source 102, in some embodiments, results in change in the flexibility of the integrated light engine 100. Thus, for example, if the flexible optical system 104 shown in FIG. 4, having the volcano-like shapes for the cellular optical elements 300, are instead placed on a flexible light source 102 such that the rim of the volcano (i.e., the upper portion 302 of the cellular optical elements 300) is nearer the flexible light source 102, instead of being opposite the flexible light source 102, the flexible optical system 104, instead of permitting flexibility of the flexible light source 102 and thus the integrated light engine 100, will instead add some rigidity to the flexible light source 102 and thus the integrated light engine 100. The flexible light source 102, and thus the integrated light engine 100, in some such embodiments, retains a degree of flexibility, but the not the degree of flexibility shown in, for example, FIG. 4. Of course, other shapes and/or sizes of flexible optical systems are possible, as shown in FIGS. 1C and 3, for example.

FIG. 3 shows an integrated light engine 100A with a flexible optical system 104 having a plurality of cellular optical elements 300 that have a pyramid shape, instead of the volcano-like shape shown in FIG. 4. The pyramid-shaped flexible optical system 104 of FIG. 3, when located on a flexible light source such that an apex (or upper portion 302) of the pyramids 300 is near the flexible light source 102, and thus the base (or lower portion 301) of the pyramids 300 is away from the flexible light source 102, adds a significant amount of rigidity and/or stiffness to the integrated light engine 100A. In such embodiments, light emitted by the integrated light engine 100A thus exits the integrated light engine 100A by passing through the lower portions 301 of the plurality of cellular optical elements 300.

Figure 6A:
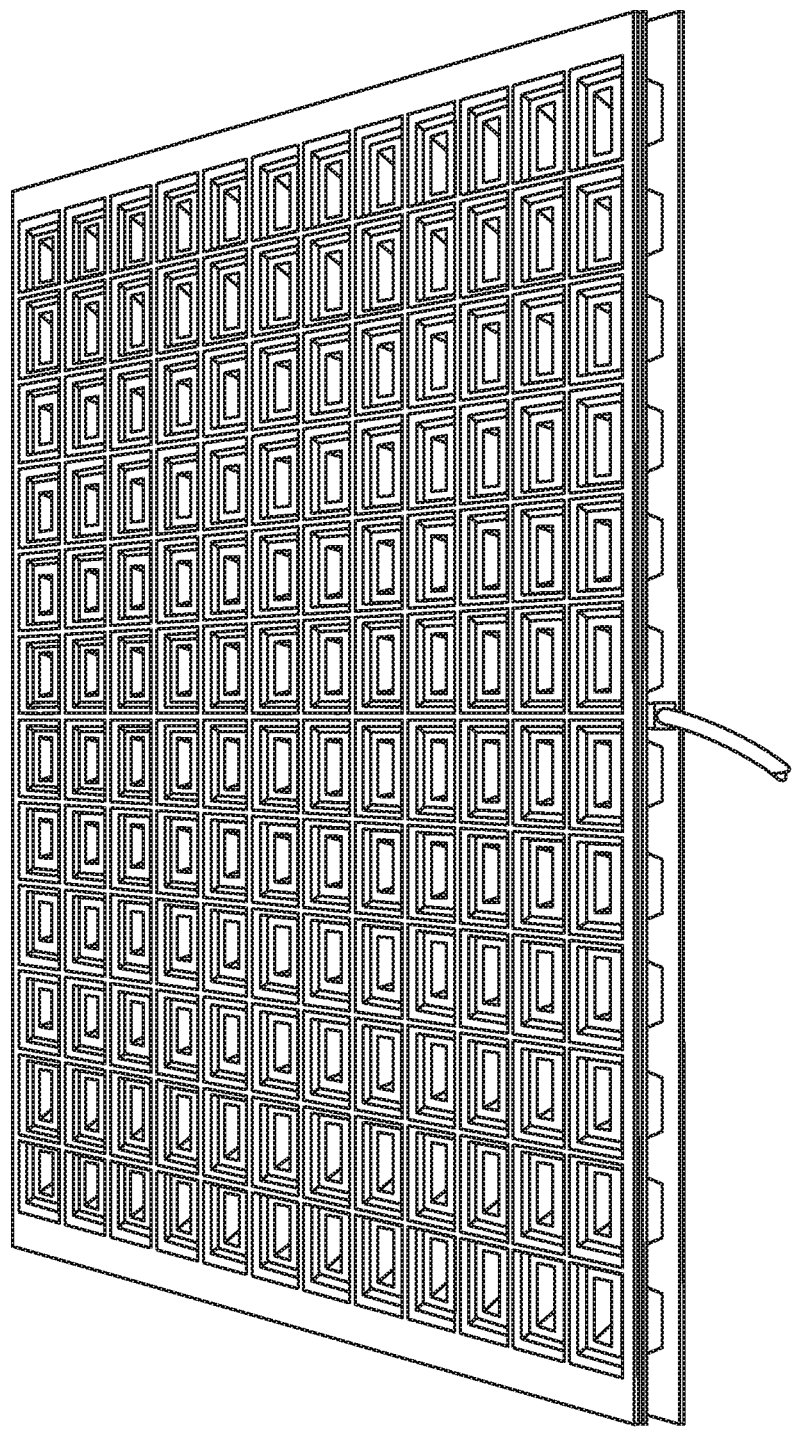
FIGS. 6A-6B show integrated light engines made into a ceiling tile/panel and a luminaire, respectively, according to embodiments disclosed herein.
Figure 6B:
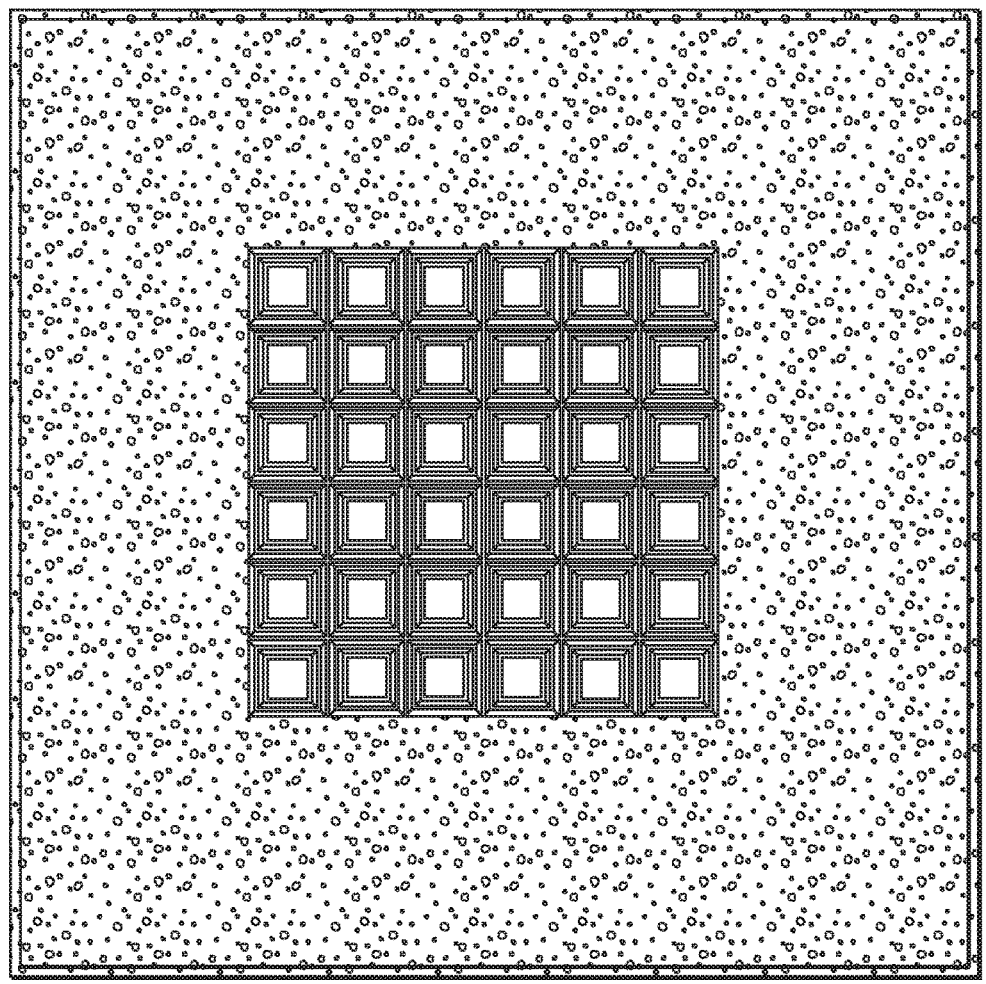

In comparison to the integrated light engine 100 of FIG. 4, which bends or flexes in part under its own weight due to gravity, the integrated light engine 100C of FIG. 3 does not bend under gravity nearly at all. Thus, when the flexible optical system 104 is coupled to the flexible light source 102 in the orientation shown in FIG. 3, with the plurality of cellular optical elements 300 in a corresponding direction as described above, such that the flexible optical system 104 is in a substantially flat state, the flexible light source 102 of the integrated light engine 100A is held in a corresponding substantially flat state by the flexible optical system 104. However, when the flexible light source 102 and the flexible optical system 104 are separated, the flexible optical system 104 and the flexible light source 102 of FIG. 3 resume their typical flexibility. This ability to switch between states by changing the orientation of the flexible optical system 104 in relation to the flexible light source 102 can be very advantageous, especially to luminaire manufactures, who often need to worry about the mechanical strength of the luminaire, and thus put sheet metal or other stiffening materials around optics/optical systems in order to maintain the structural integrity of the luminaire, at added labor and cost. Thus, when the flexible optical system 104 is coupled to the flexible light source 102 as shown in the integrated light engine 100A of FIG. 1C, with the lower portions 301 of the flexible optical system 104 nearer to the flexible light engine 102, the flexibility of the integrated light engine 100A is returned. In some embodiments, the flexibility of this arrangement may be reduced, instead of changing the orientation of the flexible optical system 104, by placing the integrated light engine 100 on a substantially stiff base, such as the heatsink 110 shown in FIG. 1A. In some embodiments, the flexibility of this arrangement may be reduced, instead of changing the orientation of the flexible optical system 104, by placing the integrated light engine 100 within a frame to create a lighting device. In some embodiments, the frame is not needed, as shown in FIG. 6A, and such embodiments may be placed within a ceiling panel/ceiling tile as shown in FIGS. 6A-6B.

Thus, when the flexible optical system 104 and the flexible light source 102 are coupled as the integrated light engine 100 shown in FIG. 4, the integrated light engine 100 is capable of entering any number of a set of flexed states (such as shown in FIGS. 1B and 4, for example). In some such states, the flexible light source 102 is correspondingly placed in the same one of the set of flexed states as the flexible optical system 104, by coupling with the flexible optical system 104. Similarly, when the flexible optical system 104 and the flexible light source 102 are coupled as the integrated light engine 100A shown in FIG. 3, the integrated light engine 100A is capable of entering any number of a set of substantially flat states (such as shown in FIG. 3). In some such states, the flexible light source 102 is held in a substantially flat state, corresponding to the substantially flat state of the flexible optical system 104, by the flexible optical system 104.

Figure 5:
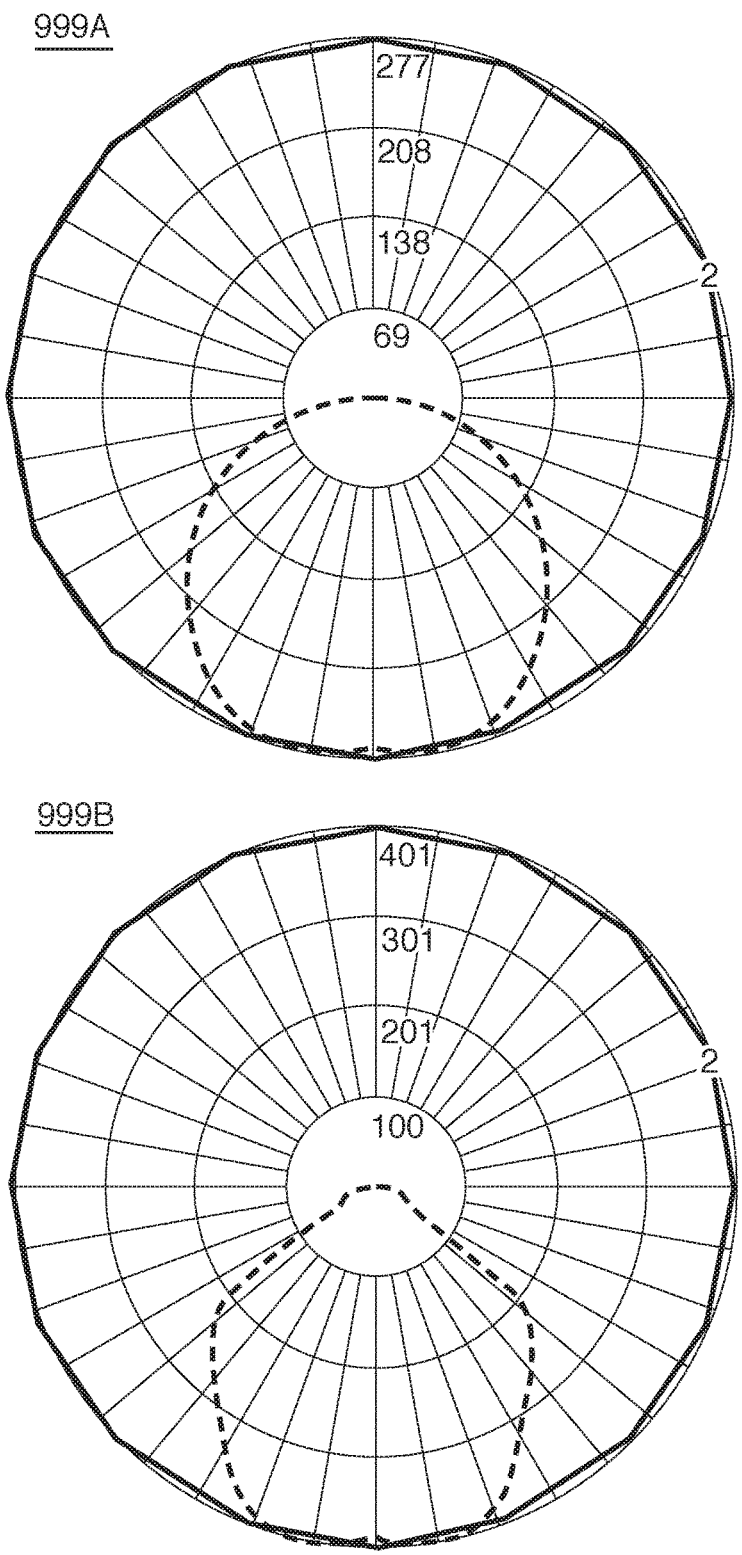
FIG. 5 shows optical distributions for various integrated light engines according to embodiments disclosed herein.

In addition to the extremely different spring constants (i.e., mechanical strengths), embodiments of the flexible optical systems shown in FIG. 4 and in FIG. 3 may, and in some embodiments do, provide similar optical distributions, as shown in FIG. 5. Without any optical system, a light distribution 999A from a flexible light source without a flexible optical system (e.g., a non-integrated light engine) is close to Lambertion. A light distribution 999B from the flexible optical system 104 shown in FIG. 3 used with a flexible light source to create an integrated light engine shows a cut-off angle of fifty degrees. The efficiency with the flexible optical system (i.e., the light distribution 999B) will drop about five percent compared to the flexible light source alone (i.e., the light distribution 999A). The light in the zone between 60 to 90 degrees is cut significantly, as shown in Table 1 below.

TABLE 1

Non-integrated light engine compared to integrated light engine

|  | Flexible Light Source Only | Integrated Light Engine (Flexible Light Source with Flexible Optical System) |
|---|---|---|
| Spacing criterion (0-180) | 1.30 | 1.26 |
| Spacing criterion (90-270) | 1.34 | 1.28 |
| Spacing criterion (Diagonal) | 1.42 | 1.36 |
| Light in zone 60-80 | 20.8% | 7.5% |
| Light in zone 80-90 | 2.9% | 1.8% |
| Flux (lm) | 856 | 812 |
| Efficiency | 100% | 95% |

In addition to the reduction of light in the sixty to ninety degree region, the flexible optical system of the integrated light engine also blocks all visibility of the source in this region. When the light source is a light emitting diode or other solid state light source, the luminance of the light source is very high and causes discomfort when looking directly at it. By eliminating its visibility, the integrated light engine is much more comfortable to look at when viewed from a distance (e.g., across a room). This type of viewing, with the head approximately horizontal, is common in office activities, among others. Only when one would look up would the light sources be visible directly in this type of integrated light engine.

Figure 7:
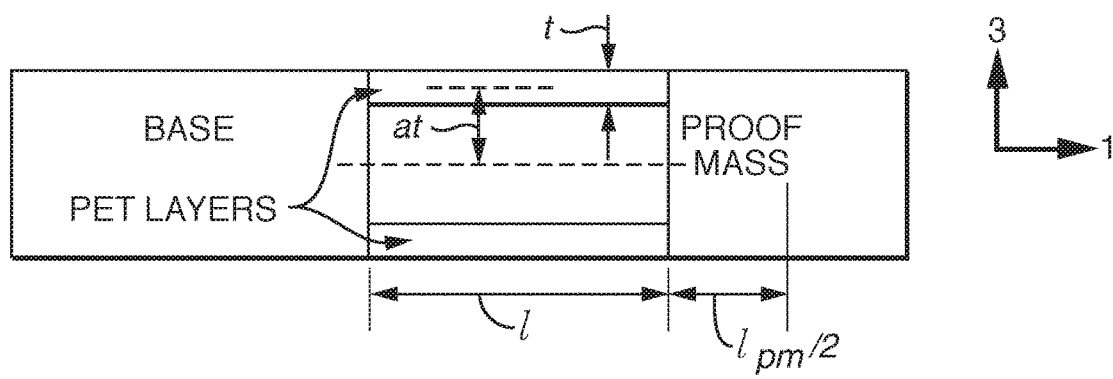
FIG. 7 illustrates a schematic structure of air-spaced PET cantilevers according to embodiments disclosed herein.

Examining an air-spaced cantilever structure, as shown in FIG. 7, which is the basic structure for the designs shown in FIGS. 3 and 4, provides insight. Assume the base and the proof mass are connected by PET material. The thickness is t, the width is w, and the length is l. The distance between the center of the PET layer and the neutral plane is $\alpha t$, i.e., $\alpha$ times the PET thickness. If the mass of the PET beams and the bending of the proof mass are neglected, the natural frequency can be estimated using the Rayleigh-Ritz method (1,2):

$$\varpi_n^2 = \frac{2E_1 I r^2 N(r)}{m l^3}, \quad (1)$$

where E1 is the Young's modulus of the PET in direction 1, m is the mass of the proof mass, $$r = \frac{l}{l + l_{pm}/2},$$

$$N(r) = \frac{36 - 36r + 12r^2}{48 - 108r + 99r^2 - 42r^3 + 7r^4},$$

and I is the moment of inertia given by $$I = \frac{wt^3}{12} + (\alpha t)^2 wt = \left(\frac{1}{12} + \alpha^2\right) wt^3. \quad (4)$$

The spring constant k is then given by $$k = \frac{2E_1 I r^2 N(r)}{l^3}. \quad (3)$$

Assume there are two types of iLEs. The first one (design A) is based on the design as shown in FIG. 4. The second one (design B) has an air gap as shown in FIG. 3. If the spring constant of design A is kA, and that of design B is kB, then based on Eqs. (2) and (3) the ratio is $$\frac{k_B}{k_A} \approx 3\alpha^2, \quad (4)$$

where we assume PET layers in the two designs have the same width w, thickness t and length l, and $\alpha 2$ is much greater than $\frac{1}{12}$.

In the design shown in FIG. 3, the ratio of $\alpha$ is 9 mm/0.5 mm=18 (20 mil PET), though of course in other embodiments other values apply. Thus the ratio of the spring constant will be 648, which explains why the integrated light engine shown in FIG. 3 is much stiffer compared to the integrated light engine shown in FIG. 4. To more accurately model the structures shown, it is necessary to assume a lot of springs connected in series and the final stiffness (or spring constant) can be derived accordingly. The basic idea remains, which is to reinforce the final structure by spacing the PET sheets properly.

Figure 8:
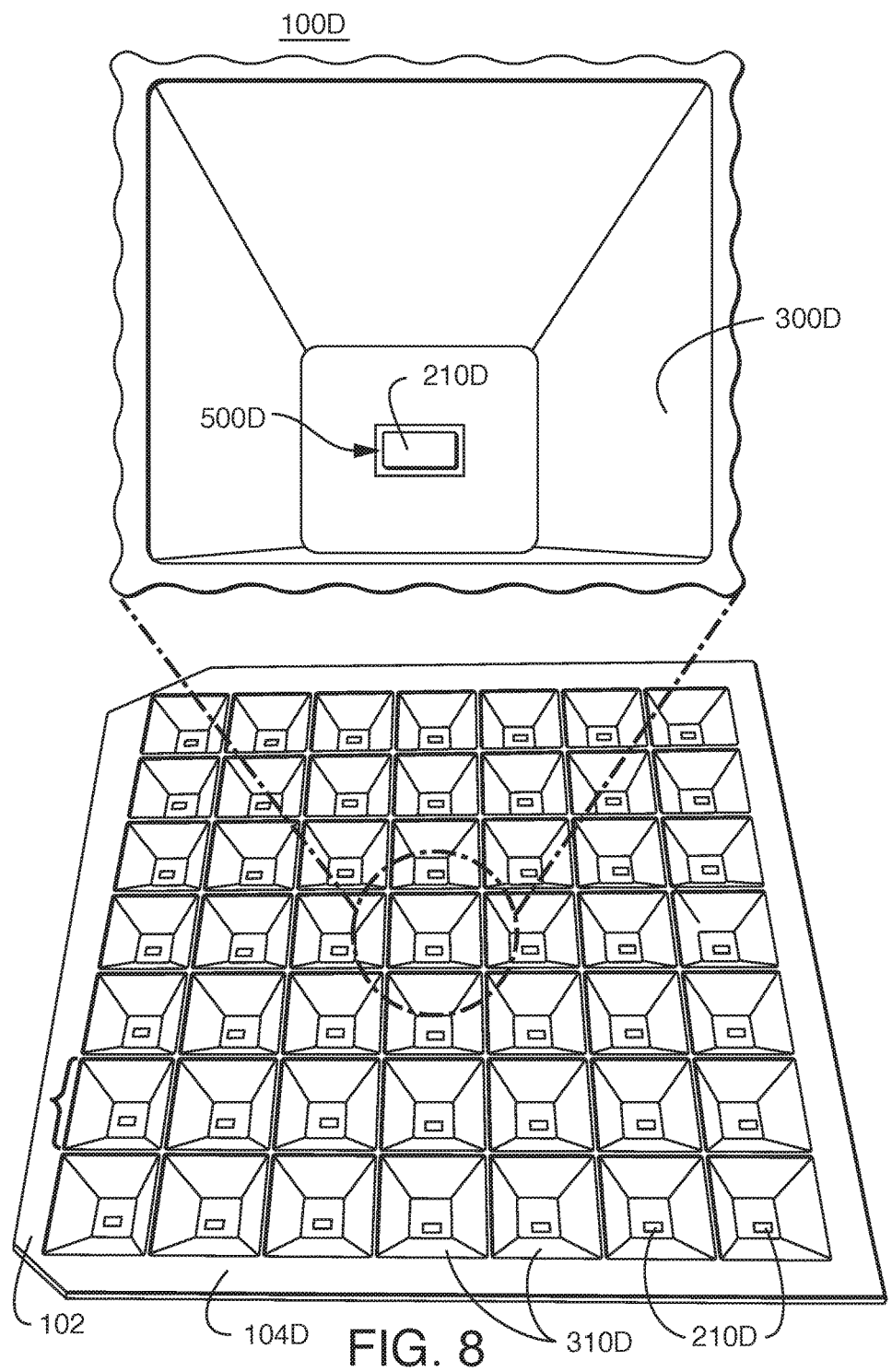
FIG. 8 illustrates an integrated light engine including a light control film, according to embodiments disclosed herein.

FIG. 8 shows another embodiment of an integrated light engine 100D. The integrated light engine 100D includes a flexible light source 102 and a flexible optical system 104D comprising a plurality of cellular optical elements 300D, each in the shape of a pyramid. In addition to each cellular optical element 300D including a light source 210D, as shown in the close-up view of a cellular optical element 300D$_1$, each cellular optical element 300D also includes a light control film 500D that is above the light source 210D. The light control film 500D further beam shapes the light emitted by the light sources 210D of the flexible light source 102, and in some embodiments, reduces glare associated with the integrated light engine 100D. Such light control films 500D are described in greater detail in co-pending application "LIGHT CONTROL FILMS AND LIGHTING DEVICES INCLUDING THE SAME", filed on the same day as the current application, the entire contents of which are hereby incorporated by reference. Placement of the light control films 500D within the cellular optical elements 300D is described in greater detail in co-pending application "HYBRID OPTICAL SYSTEMS INCLUDING FLEXIBLE OPTICAL SYSTEMS AND LIGHT CONTROL FILMS", filed on the same day as the current application.

Though embodiments are described above with reference to flexible PET as the substrate for the flexible light engine, a completely flexible substrate is not required to achieve the results described throughout. In some embodiments, the substrate of the light engine, to achieve a higher optical efficiency, should itself have a high reflectivity. In some embodiments, this is achieved by, for example, placing a white PET film over the substrate. However, in some embodiments a metalized PET sheet can also be advantageous, especially when the solid state light sources are to be aimed in one or more certain directions for better beam shaping capabilities.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. An integrated light engine, comprising:
   a flexible light source configured to emit light, comprising a flexible substrate and a plurality of solid state light sources coupled to a first surface of the flexible substrate, wherein the flexible substrate comprises a planar shape having a thickness when in a substantially flat state; and
   a flexible optical system coupled thereto,
   wherein the flexible optical system beam shapes light emitted by the flexible light source,
   wherein the flexible optical system sits on top of the flexible light source, such that the thickness of the flexible substrate is exposed,
   wherein the flexible optical system comprises a sheet defining a plurality of cellular lighting elements,
   wherein each of the plurality of cellular lighting elements comprise a lower portion and an upper portion, opposite the lower portion,
   wherein the lower portions of the plurality of cellular lighting elements are coupled together to form the sheet,
   wherein each of the plurality of cellular lighting elements are one of pyramid shaped, volcano shaped, nozzle shaped, frustum shaped, or dome shaped, and
   wherein the lower portions are positioned more proximate to the flexible light source than the upper portions and the upper portions of the plurality of cellular lighting elements are spaced apart and not coupled together so that the light emitted by the flexible light source enters the lower portions and exits the upper portions and so that the flexible light source with the flexible optical system coupled thereto is bendable to place the first surface in a concave configuration.

2. The integrated light engine of claim 1, wherein the integrated light engine is configured to be placed into a lighting device, such that, when the flexible light source receives power, light emitted by the flexible light source and beam shaped by the flexible optical system illuminates an area.

3. The integrated light engine of claim 1, wherein the flexible substrate comprises conductive traces and the plurality of solid state light sources are electrically connected to the conductive traces, and wherein the flexible substrate is capable of moving between the substantially flat state and a substantially flexed state.

4. The integrated light engine of claim 3, wherein the flexible optical system has a footprint corresponding to the planar shape of the flexible substrate when in the substantially flat state.

5. The integrated light engine of claim 1, wherein the plurality of cellular optical elements are interconnected so as to occupy a plane corresponding to the footprint of the flexible optical system.

6. The integrated light engine of claim 1, wherein the plurality of solid state light sources are arranged in a first arrangement on the flexible substrate and wherein the plurality of cellular optical elements are arranged in a second arrangement.

7. The integrated light engine of claim 6, wherein the first arrangement and the second arrangement correspond such that at least one cellular optical element in the plurality of cellular optical elements contains at least one of the plurality of solid state light sources.

8. The integrated light engine of claim 1, wherein the flexible light source has is configurable to be in a substantially flat state, and wherein a shape of the flexible light source in the substantially flat shape is a planar shape corresponding to the footprint of the flexible optical system.

9. The integrated light engine of claim 1, wherein the flexible light source is capable of moving between a substantially flat state and a flexed state, and wherein the flexible optical system is capable of moving between a substantially flat state and a flexed state.

10. The integrated light engine of claim 9, wherein the flexible light source is capable of moving between a substantially flat state and a plurality of flexed states, and wherein the flexible optical system is capable of moving between a substantially flat state and a plurality of flexed states.

11. The integrated light engine of claim 9, wherein the flexible optical system is coupled to the flexible light source in an orientation, with the plurality of cellular optical elements in a corresponding direction.

12. The integrated light engine of claim 11, wherein the flexible optical system is coupled to the flexible light source in a first orientation, with the plurality of cellular optical elements in a corresponding first direction, such that the flexible optical system is in a substantially flat state, and the flexible light source is held in a corresponding substantially flat state by the flexible optical system.

13. The integrated light engine of claim 11, wherein the flexible optical system is coupled to the flexible light source in a second orientation, with the plurality of cellular optical elements in a corresponding second direction, such that the flexible optical system is capable of being placed in one of a set of flexed states, and the flexible light source is correspondingly placed in the same one of the set of flexed states.

14. A lighting device comprising:
an electrical connection from a power source; and
an integrated light engine, comprising:
a flexible light source configured to emit light, comprising a flexible substrate and a plurality of solid state light sources coupled to a first surface of the flexible substrate, wherein the flexible substrate comprises a planar shape having a thickness when in a substantially flat state; and
a flexible optical system coupled thereto,
wherein the flexible optical system beam shapes light emitted by the flexible light source,
wherein the flexible optical system sits on top of the flexible light source, such that the thickness of the flexible substrate is exposed;
wherein the flexible optical system comprises a sheet defining a plurality of cellular lighting elements,
wherein each of the plurality of cellular lighting elements comprise a lower portion and an upper portion, opposite the lower portion,
wherein the lower portions of the plurality of cellular lighting elements are coupled together to form the sheet,
wherein each of the plurality of cellular lighting elements are one of pyramid shaped, volcano shaped, nozzle shaped, frustum shaped, or dome shaped,
wherein the lower portions are positioned more proximate to the flexible light source than the upper portions and the upper portions of the plurality of cellular lighting elements are spaced apart and not coupled together so that the light emitted by the flexible light source enters the lower portions and exits the upper portions and so that the integrated light engine is capable of entering a set of states, such that a portion of beam shaped light emitted by the integrated light engine in a first state of the set of states is aimed in a first direction and a portion of beam shaped light emitted by the integrated light engine in a second state of the set of states is aimed in a second direction, and
wherein in the second state the first surface is in a concave configuration.

15. The lighting device of claim 14, wherein the first state is a first flexed state, wherein the second state is a second flexed state, wherein the first flexed state is different from the second flexed state, and wherein the first direction is different from the second direction.

16. The lighting device of claim 14, wherein the first state is a first flexed state, wherein the second state is a second flexed state, wherein the first flexed state is different from the second flexed state, and wherein the first direction is the same as the second direction.

17. The lighting device of claim 14, wherein the flexible optical system is coupled to the flexible light source in a first orientation, such that the set of states the integrated light engine is capable of entering is a set of flexed states.

18. The lighting device of claim 14, wherein the flexible optical system is coupled to the flexible light source in a second orientation, such that the set of states the integrated light engine is capable of entering is a set of substantially flat states.

19. The lighting device of claim 18, wherein the set of substantially flat states comprises a substantially flat, substantially stiff state.

20. The lighting device of claim 14, wherein the flexible optical system is coupled to the flexible light source in an orientation, with the plurality of cellular optical elements in a corresponding direction.

21. The lighting device of claim 20, wherein the flexible optical system is coupled to the flexible light source in a first orientation, with the plurality of cellular optical elements in a corresponding first direction, such that the flexible optical system is in a substantially flat state of the set of states, and the flexible light source is held in a corresponding substantially flat state by the flexible optical system.

22. The lighting device of claim 20, wherein the flexible optical system is coupled to the flexible light source in a second orientation, with the plurality of cellular optical elements in a corresponding second direction, such that the flexible optical system is capable of being placed in one of a set of flexed states of the set of states, and the flexible light source is correspondingly placed in the same one of the set of flexed states of the set of states.

* * * * *